(12) United States Patent
Sasaki (10) Patent No.: US 10,486,239 B2
(45) Date of Patent: Nov. 26, 2019

(54) CUTTING TOOL

(71) Applicant: TUNGALOY CORPORATION, Fukushima (JP)

(72) Inventor: Yasutake Sasaki, Iwaki (JP)

(73) Assignee: TUNGALOY CORPORATION, Iwaki-shi, Fukushima (JP)

(*) Notice: Subject to any disclaimer, the term of this patent is extended or adjusted under 35 U.S.C. 154(b) by 128 days.

(21) Appl. No.: 15/552,351

(22) PCT Filed: Feb. 23, 2016

(86) PCT No.: PCT/JP2016/055138
§ 371 (c)(1),
(2) Date: Aug. 21, 2017

(87) PCT Pub. No.: WO2016/136694
PCT Pub. Date: Sep. 1, 2016

(65) Prior Publication Data
US 2018/0009040 A1    Jan. 11, 2018

(30) Foreign Application Priority Data

Feb. 24, 2015    (JP) ................................ 2015-033964

(51) Int. Cl.
   *B23B 27/16*    (2006.01)
   *B23B 27/14*    (2006.01)
   *B23B 27/22*    (2006.01)

(52) U.S. Cl.
   CPC .............. *B23B 27/22* (2013.01); *B23B 27/14* (2013.01); *B23B 27/1607* (2013.01);
   (Continued)

(58) Field of Classification Search
   CPC ....... B23B 27/143; B23B 27/14; B23B 27/22; B23B 27/1607; B23B 2200/321;
   (Continued)

(56) References Cited

U.S. PATENT DOCUMENTS 4,087,192 A * 5/1978 Hertel ................. B23B 27/1618
                                                              407/114
4,214,845 A * 7/1980 Mori ..................... B23B 27/141
                                                              407/114
(Continued)

FOREIGN PATENT DOCUMENTS

DE         3321982 C1 * 10/1984    ........... B23B 27/141
DE         4201112 A1 *  7/1993    ........... B23B 27/141
(Continued)

OTHER PUBLICATIONS

JP01252307 Detailed Description (translation) obtained at https://dialog.proquest.com/professional/patents/lookuppatent?accountid=161361 (last visited Feb. 16, 2019).*
(Continued)

*Primary Examiner* — Ryan C Rufo
(74) *Attorney, Agent, or Firm* — Studebaker & Brackett PC (57) ABSTRACT

A cutting tool having a cutting edge member which forms at least one corner part, wherein a material for the cutting edge member is selected from either diamond, an ultrahigh-pressure sintered body containing cubic boron nitride or a PVD or CVD coating applied to a surface of the ultrahigh-pressure sintered body. At least part of an intersecting edge between an end surface of the cutting edge member and a peripheral side surface thereof is provided with a cutting edge. A chip breaker comprising a breaker wall surface is formed in the end surface of the cutting edge member. The breaker wall surface has at least one projected surface part which bulges outwardly from the cutting tool. As viewed from the end surface, the recessed surface part is arranged so as to be apart from a virtual plane A which is defined so as to divide the corner part into halves.

7 Claims, 7 Drawing Sheets

(52) U.S. Cl.
CPC . *B23B 2200/0447* (2013.01); *B23B 2226/125* (2013.01); *B23B 2226/31* (2013.01); *B23B 2228/04* (2013.01); *B23B 2228/08* (2013.01)

(58) Field of Classification Search
CPC . B23B 27/20; B23B 27/1618; B23B 27/1637; B23B 27/1648; B23B 27/141; B23B 2226/125
See application file for complete search history.

(56) References Cited

U.S. PATENT DOCUMENTS

| | | | | |
|---|---|---|---|---|
| 5,282,703 | A * | 2/1994 | Itaba | B23B 27/143 407/114 |
| 5,743,681 | A | 4/1998 | Wiman et al. | |
| 6,065,907 | A * | 5/2000 | Ghosh | B23B 27/141 407/114 |
| 6,106,585 | A * | 8/2000 | Packer | B22F 5/003 264/430 |
| 6,123,488 | A * | 9/2000 | Kasperik | B23B 27/141 407/113 |
| 6,241,430 | B1 | 6/2001 | Norstrom | B23B 27/143 407/114 |
| 8,672,590 | B2 * | 3/2014 | Tanaka | B23B 27/141 407/113 |
| 10,232,445 | B2 * | 3/2019 | Ikeda | B23B 27/141 |
| 2003/0086767 | A1 | 5/2003 | Wiman | B23B 27/141 407/114 |
| 2005/0019111 | A1 * | 1/2005 | Kitagawa | B23B 27/141 407/113 |
| 2005/0249559 | A1 * | 11/2005 | Lof | B23B 27/141 407/113 |
| 2005/0254909 | A1 * | 11/2005 | Krahula | B23B 27/143 407/114 |
| 2011/0070039 | A1 * | 3/2011 | Park | B23B 27/141 407/113 |
| 2012/0128438 | A1 * | 5/2012 | Tanaka | B23B 27/141 407/115 |
| 2012/0230785 | A1 * | 9/2012 | Chen | B23B 27/141 407/114 |
| 2013/0064613 | A1 * | 3/2013 | Krishtul | B23B 27/143 407/114 |
| 2015/0043982 | A1 * | 2/2015 | Tensaka | B23B 27/143 407/114 |
| 2015/0090081 | A1 * | 4/2015 | Onodera | B23B 27/143 82/1.11 |
| 2017/0297115 | A1 * | 10/2017 | Ekden | B23B 27/141 |

FOREIGN PATENT DOCUMENTS

| | | | | |
|---|---|---|---|---|
| DE | 202006002827 | U1 | 5/2006 | |
| EP | 0730925 | A1 * | 9/1996 | ........... B23B 27/143 |
| EP | 1967304 | A2 * | 9/2008 | ........... B23B 27/143 |
| GB | 1419743 | A * | 12/1975 | ......... B23B 27/1648 |
| JP | 01171705 | A * | 7/1989 | |
| JP | 01252307 | A * | 10/1989 | |
| JP | H03-62708 | U1 | 6/1991 | |
| JP | H08-508684 | A | 9/1996 | |
| JP | H11-48006 | A | 2/1999 | |
| JP | 2001047306 | A * | 2/2001 | |
| JP | 2001347405 | A * | 12/2001 | |
| JP | 2004-223648 | A | 8/2004 | |
| JP | 2006095620 | A * | 4/2006 | |
| JP | 2006341321 | A * | 12/2006 | |
| JP | 2007190633 | A * | 8/2007 | |
| JP | 2007-260848 | A | 10/2007 | |
| JP | 2007290059 | A * | 11/2007 | |
| JP | 2008200831 | A * | 9/2008 | |
| JP | 2008207312 | A * | 9/2008 | |
| JP | 2011-036932 | A | 2/2011 | |
| JP | 2012045664 | A * | 3/2012 | |
| SU | 814573 | A1 * | 3/1981 | ........... B23B 27/141 |
| WO | 2001/060554 | A1 | 8/2001 | |
| WO | WO-03070404 | A1 * | 8/2003 | ........... B23B 27/141 |

OTHER PUBLICATIONS

Description JP2012045664 (translation) obtained at https://worldwide.espacenet.com/ (last visited Feb. 19, 2019).*
International Search Report issued in PCT/JP2016/055138; dated Mar. 22, 2016.
International Preliminary Report on Patentability and Written Opinion issued in PCT/JP2016/055138 dated Aug. 29, 2017.

* cited by examiner

CUTTING TOOL

TECHNICAL FIELD

The present invention relates to a cutting tool in which a cutting edge member containing an ultrahigh-pressure sintered body is secured to an area including a corner part.

BACKGROUND ART

Patent Document 1 discloses a conventional cutting tool. That is, such cutting tool is a cutting tool which comprises a corner part and in which a cutting edge member containing an ultrahigh-pressure sintered body, being comprised of at least either cubic boron nitride or diamond, is secured to an area containing the corner part, and a chip breaker having a breaker wall surface is formed in a surface of the cutting edge member. A recessed part is formed between two adjacent breaker wall surfaces. The cutting tool employs a cutting insert, and the cutting edge member is secured to the cutting insert.

CITATION LIST

Patent Documents

Patent Document 1: JP2007-260848 A

SUMMARY

Technical Problem

The cutting tool of Patent Document 1 has provided a certain effect of increasing the force of binding chips and thereby improving chip control or chip disposal capacity. However, such effect is still not enough, and there has been a demand for further improvement in chip disposal capacity. In particular, in the form of cutting, being called copy machining, etc., in which the direction of the flow of chips varies, further improvement in chip disposal capacity has been demanded.

Solution to Problem

A cutting tool according to the present invention is a cutting tool comprising a cutting edge member which forms at least one corner part, wherein a material for the cutting edge member is selected from either diamond, an ultrahigh-pressure sintered body containing cubic boron nitride or a PVD or CVD coating applied to a surface of the ultrahigh-pressure sintered body. At least part of an intersecting edge between an end surface of the cutting edge member and a peripheral side surface thereof is provided with a cutting edge. A chip breaker comprising a breaker wall surface is formed in the end surface of the cutting edge member. The breaker wall surface has at least one projected surface part which is curved so as to bulge outward from the cutting tool. As viewed from the end surface, the recessed surface part is arranged so as to be apart from a virtual plane A which is defined so as to divide the corner part into halves.

Advantageous Effects of Invention

The cutting tool of the present invention has an extremely large force of binding chips and thereby significantly improves chip disposal capacity.

DESCRIPTION OF EMBODIMENTS

An embodiment of a cutting tool to which the present invention is applied will be described with reference to the attached drawings. As shown in FIGS. 1 to 5, the cutting tool of the present embodiment employs a cutting insert 1 which comprises a plurality of corners or corner parts 2 and in which cutting edge members 3, each of which contains an ultrahigh-pressure sintered body, are respectively secured to areas respectively including two of the corners or corner parts 2. Various types of such cutting tool employing the cutting insert 1 are known, and thus, the cutting tool is not shown in the drawings, and the description of the cutting tool will be omitted. The cutting tool of the present invention will hereinafter be referred to as the cutting insert 1. However, the cutting tool of the present invention is not limited to comprising the configuration of employing the cutting insert 1. The cutting tool of the present invention may also be a cutting tool in which cutting edge members 3 are secured, via brazing, etc., to a byte, an end mill or the like. The ultrahigh-pressure sintered body of the cutting insert 1 in the present embodiment is provided by applying a PVD coating to a surface of a sintered body containing cubic boron nitride. The cutting insert 1 is formed so as to have a contour shape of a substantially rhombic plate with 80° acute corner angles. Therefore, the cutting insert 1 has four corner parts on one side thereof, i.e., eight corner parts on both sides thereof. In the cutting insert 1 of the present embodiment, the two cutting edge members 3 are secured to only the two corner parts 2, being located on one side, each of which has a corner part angle of 80°, and no cutting edge members 3 are secured to the remaining six corner parts. The two corner parts 2 are formed in a shape of 180-degree rotational symmetry in a plan view with respect to a center of the cutting insert 1. In other words, when this cutting insert 1 is, for example, worn via the use of one corner part 2, such cutting insert 1 can be used at least twice by changing the direction thereof so as to reverse the corner part 2 and the second corner part 2. For the purposes of simplifying the description, only one of the corner parts 2 will be describe below. The same applies to the other corner part 2, and thus, the description thereof will be omitted.

Figure 1:
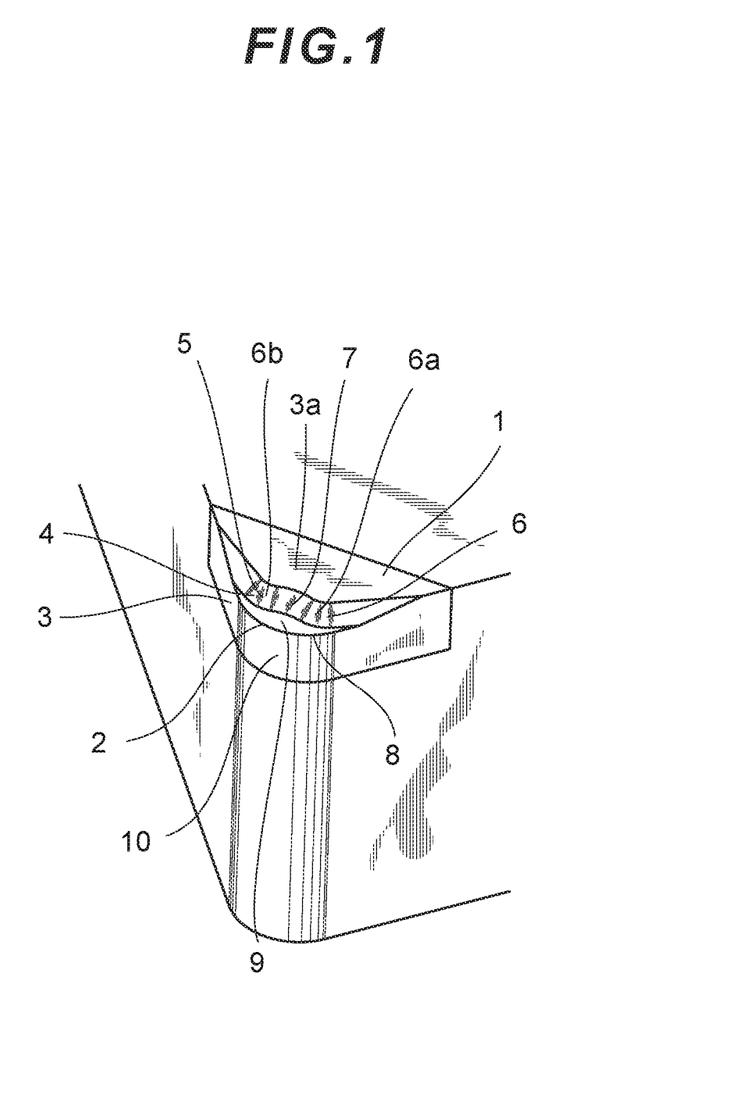
FIG. 1 is a perspective enlarged view of a cutting tool (cutting insert) according to a first embodiment.
Figure 2:
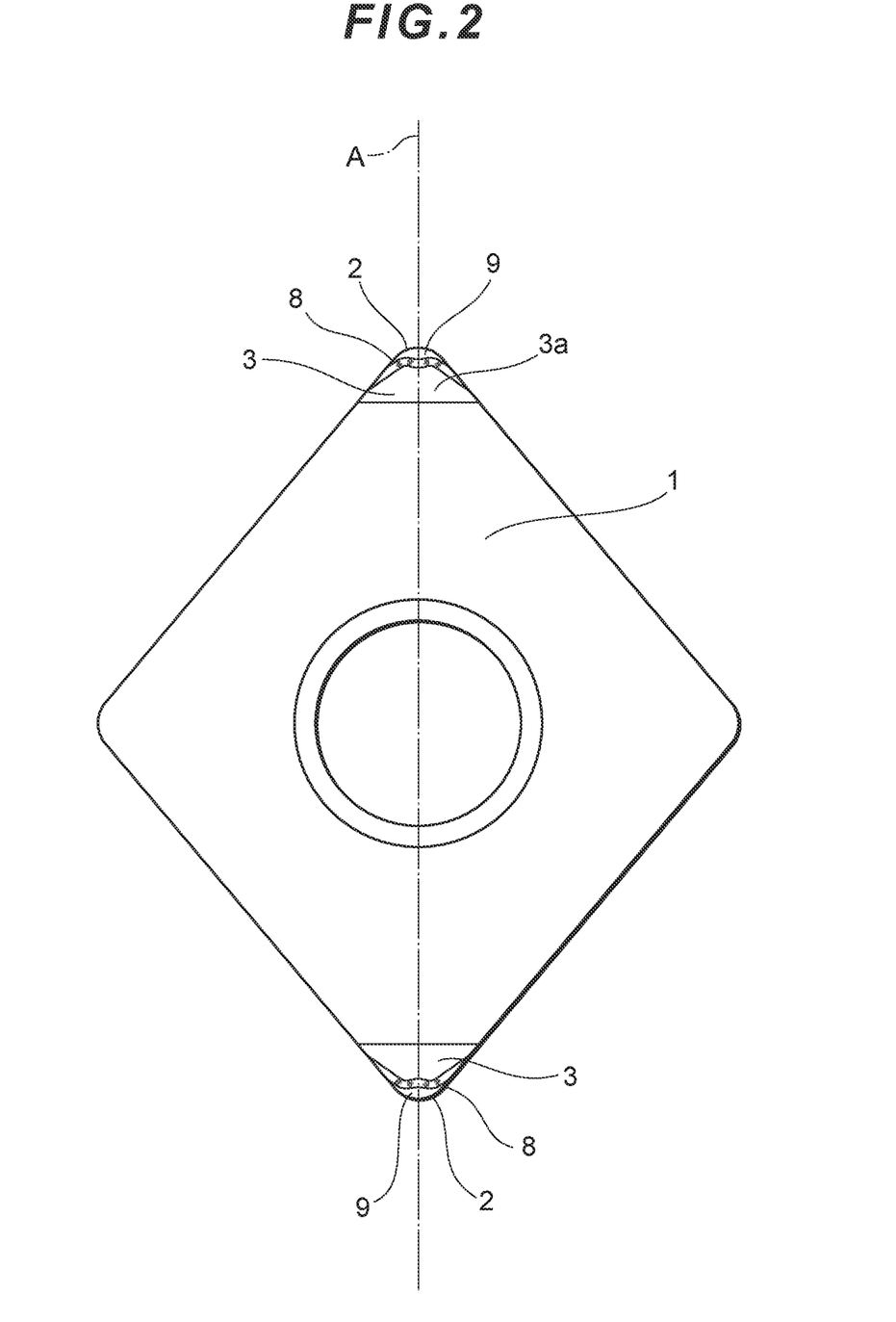
FIG. 2 is a plan view of the cutting tool of FIG. 1.
Figure 3:
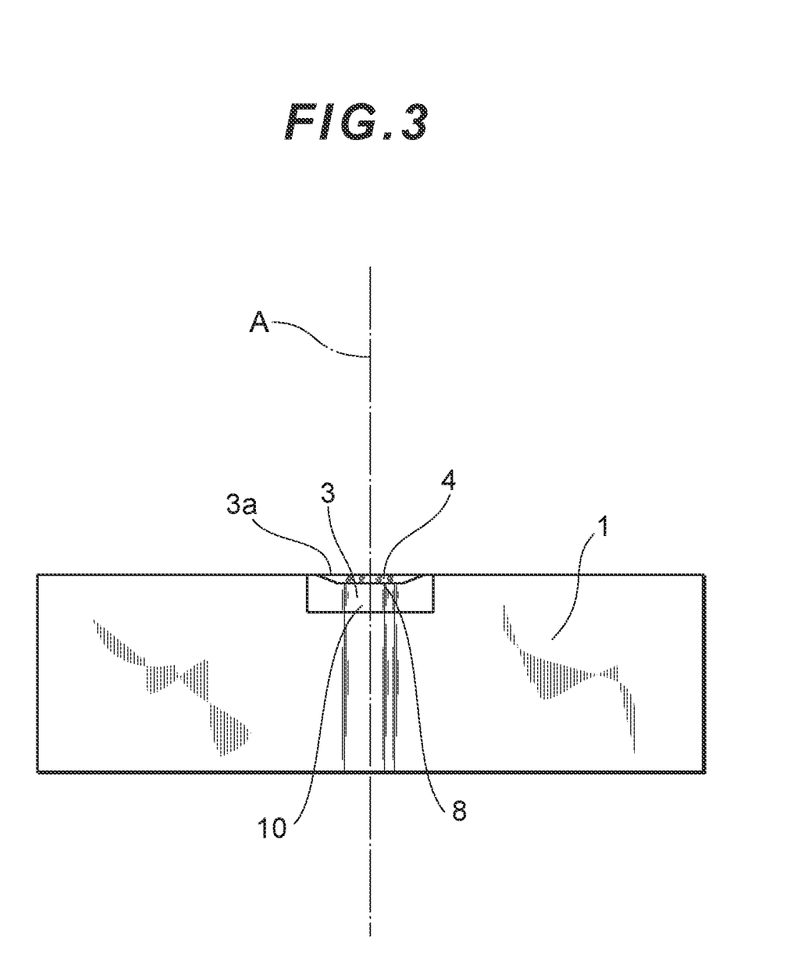
FIG. 3 is a front view of the cutting tool of FIG. 1.
Figure 4:
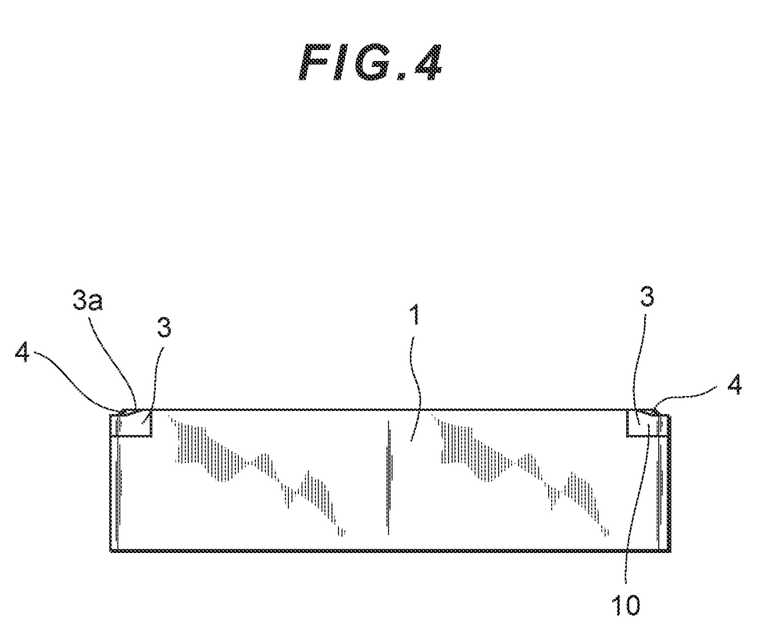
FIG. 4 is a right side view of the cutting tool of FIG. 1.
Figure 5:
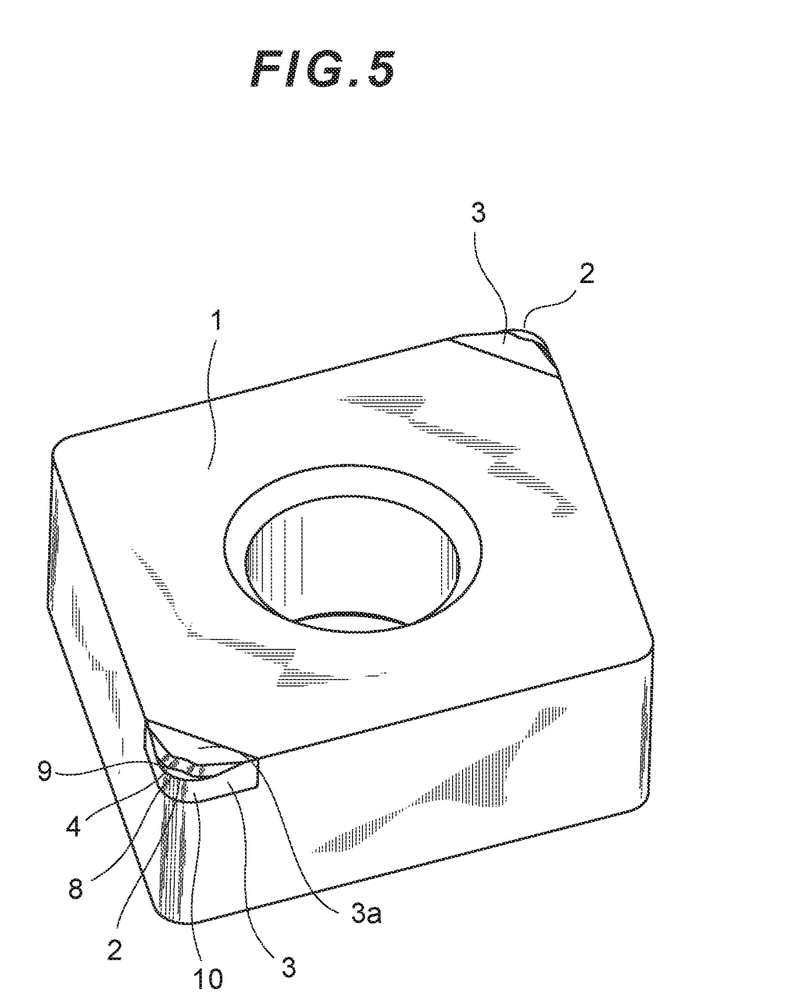
FIG. 5 is a perspective view of the cutting tool of FIG. 1.

In the cutting edge member 3 of the cutting insert 1, an end surface 3a and a peripheral side surface (or a peripheral surface) form part of a surface of the cutting insert 1. In other words, the end surface (upper surface) 3a of the cutting edge member 3 serves as part of an end surface (upper surface) of the cutting insert 1, and the peripheral side surface of the cutting edge member 3 serves as part of a peripheral side surface of the cutting insert 1. The other end surface (lower surface) of the cutting insert 1 is a plane and serves as a seating surface when the cutting insert 1 is mounted on a cutting tool. The cutting edge member 3 has a cutting edge 8, a rake surface 9 and a flank 10. The flank 10 is formed in the peripheral side surface of the cutting edge member 3. A chip breaker 4 comprising a breaker wall surface 5 is formed in the end surface 3a serving as the upper surface of the cutting edge member 3. The cutting insert 1 of the present embodiment may be formed in a shape of reflection symmetry to a bisector of the corner part 2, as viewed from a direction facing the end surface 3a, in order to deal with both right-hand use and left-hand use. In other words, as viewed from the direction facing the end surface 3a, the cutting edge 8 and the chip breaker 4 may be arranged so as to show reflection symmetry to the bisector of the corner part 2. Herein, as shown in FIGS. 2 and 3, as viewed from the end surface 3a, of the cutting edge member 3, which is provided with the chip breaker 4, a virtual plane A which divides the corner part 2 into halves is defined. To put it another way, the virtual plane A is defined so as to pass through a center of the corner part 2 and to divide the cutting insert 1 into halves. It should be noted that dividing the corner part 2 into halves refers to dividing a contour shape of the corner part 2 into halves. Further, a reflection-symmetrical shape with respect to the bisector of the corner part 2 refers to a plane symmetrical shape with respect to the virtual plane A. In the present embodiment, the chip breaker 4, comprising the breaker wall surface 5, which is arranged in the corner part 2 is formed in a shape of plane symmetry with respect to the virtual plane A. As to the cutting insert 1, all of the portions thereof are each formed in a shape of plane symmetry to the virtual plane A. In other words, all of the portions of the cutting insert 1 each have a relationship of refection reflection symmetry to the virtual plane A. For the purposes of simplifying the following description, only one of the shapes constituting plane symmetry will be described below while description of the other shape will be omitted. It should be noted that, although the term of a wall surface is used for an upward surface, such term is used for the purposes of description only and is not intended to define either the absolute directions in a space or the absolute positional relationships therein. The same applies to the terms of an upper surface, a lower surface, etc., and to the terms which express the directions in other spaces and the positional relationships therein.

As viewed from the end surface 3, of the cutting edge member 3, which is provided with the chip breaker 4, i.e., in a plan view, the breaker wall surface 5 has two projected surface parts 6 which are curved so as to bulge outward from the cutting insert 1. One of the projected surface parts 6 is referred to as a first projected surface part 6a while the other projected surface part is referred to as a second projected surface part 6b. In a plan view, the two projected surface parts 6a, 6b are arranged so as to be apart from each other. A recessed surface part 7 is provided between the two projected surface parts 6a, 6b and is curved so as to be dented inward of the cutting insert 1. In other words, the two projected surface parts 6a, 6b are arranged so as to sandwich the recessed surface part 7 therebetween. The cutting insert 1 of the present embodiment is provided with only one recessed surface part 7. The recessed surface part 7 intersects with the virtual plane A so as to traverse the virtual plane A. In other words, the two projected surface parts 6a, 6b are apart from the virtual plane A and are arranged on both sides of the virtual plane A. In a plan view, a contour shape of a portion of the projected surface part 6 which is located on an upper boundary of the breaker wall surface 5 is a substantially circular-arc shape. In other words, in a plan view, a contour shape of a portion of the projected surface part 6 which is located on an edge of the breaker wall surface 5, such edge being distant from the corner part 2, is a substantially circular-arc shape. In a plan view, a contour shape of a portion of the recessed surface part 7 which is located on the upper boundary of the breaker wall surface 5 is a substantially circular-arc shape. In other words, in a plan view, a contour shape of a portion of the recessed surface part 7 which is located on an edge of the breaker wall surface 5, such edge being distant from the corner part 2, is a substantially circular-arc shape.

The rake surface 9 of the chip breaker 4 is given a positive rake angle so as to be depressed inward of the cutting insert 1 as the rake surface 9 is further apart from the cutting edge 8. In other words, the chip breaker 4 is provided with a chip breaker groove.

Next, the operation and effects of the cutting tool of the present invention will be described. When the cutting insert 1 is used as a right-hand cutting tool, the first projected surface part 6a, which is arranged on the right side as seen from the corner part 2, acts on the generation of chips in cooperation with the recessed surface part 7. When the cutting insert 1 is used as a left-hand cutting tool, the second projected surface part 6b, which is arranged on the left side as seen from the corner part 2, acts in cooperation with the recessed surface part 7. Herein, description will be made regarding the operation when the cutting insert 1 is used as a right-hand cutting tool. The same applies to the operation when the cutting insert 1 is used as a left-hand cutting tool, and thus, the description thereof will be omitted. In general, with regard to cutting, in particular, lathing and milling, performed by a cutting tool comprising the cutting edge 8 comprised of an ultrahigh-pressure sintered body, the cutting depth and the feed, serving as cutting conditions, are set so as to be small. Thus, the chips which are produced have a narrow width and a thin thickness, thereby easily making it extremely difficult to control chip or perform a chip control (or disposal) process. In particular, when performing copy turning with a lathe, a portion of the cutting edge 8 which generates chips in the corner part 2 greatly varies during cutting, and the direction in which chips flow greatly varies accordingly. Thus, it easily becomes very difficult to perform a chip disposal process. In the cutting insert 1 of the present embodiment, when chips are produced around the center of the corner part 2, that is, when chips are produced around the bisector of the corner part 2, such chips flow from the corner part 2 toward the recessed surface part 7. At this time, since the first projected surface part 6a is projected further toward the corner part 2 than the recessed surface part 7, flowing chips collide with the first projected surface part 6a. The first projected surface part 6a is a curved surface which bulges outward, and the recessed surface part 7 is arranged so as to be adjacent to the projected surface part 6a and curved so as to be dented inward. Thus, the chips which have collided with the first projected surface part 6a receive not only a force which bends chips upward via the rake surface 9 and the breaker wall surface 5 but also a force which laterally bends chips toward the recessed surface part 7, namely, toward the virtual plane A. In other words, as to chips flowing from the corner part 2 toward the recessed surface part 7, when a portion of each chip which is shifted or deviated from the center thereof hits the first projected surface part 6a, the chip is also bent laterally. As a result, chips are separated into smaller pieces, compared with the case of receiving an upward force only. It should be noted that, since the contour shape of each of the portions of the projected surface part 6 and the recessed surface part 7 which are located on the upper boundary of the breaker wall surface 5 in a plan view is a substantially circular-arc shape, the projected surface part 6 and the recessed surface part 7 can be connected so as to constitute a smoothly curved surface having no corners, for example, no edges. Such configuration makes it possible to suppress the progress of wear (abrasion), due to chips hitting the connecting part between the projected surface part 6 and the recessed surface part 7.

Figure 6:
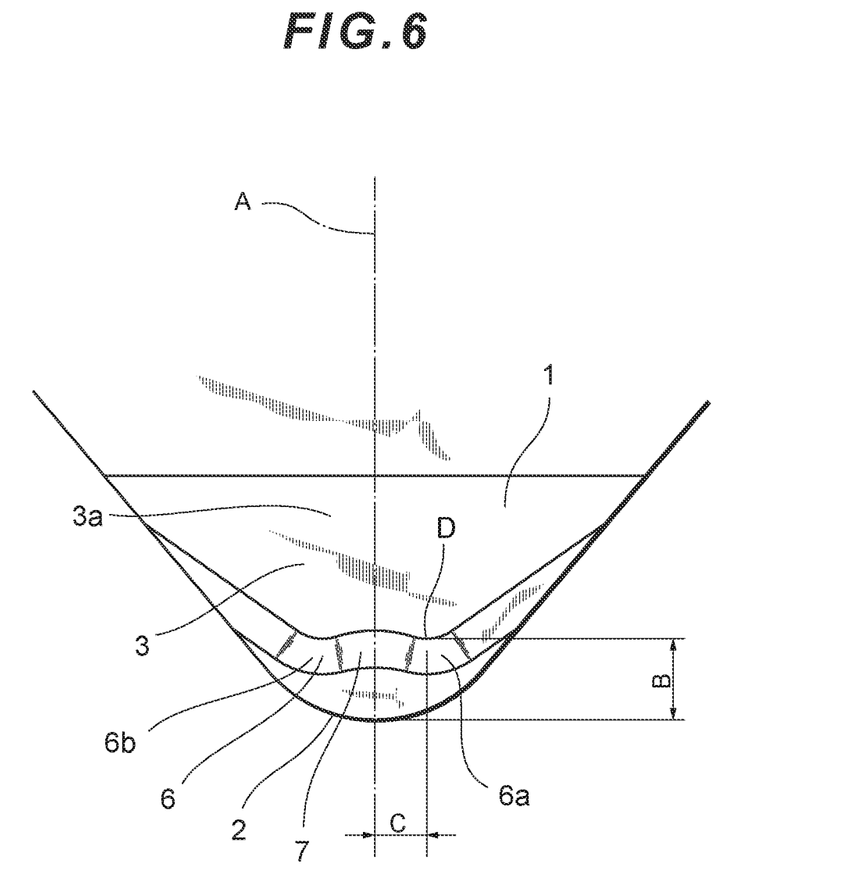
FIG. 6 is a partially enlarged, plan view of the cutting tool of FIG. 1.

The breaker width B of the cutting insert 1 of the present embodiment is typified by the dimension shown in FIG. 6. The breaker width B refers to a dimension in a direction parallel to the virtual plane A in a plan view, the dimension being defined as ranging from the center of the corner part 2 to the position of a projected point D, where the first projected surface part 6a is furthest projected, on the upper boundary of the breaker wall surface 5. Further, in a plan view, a distance from the virtual plane A to the projected point D is defined as an amount of shifting C. Such defined amount of shifting C is preferably from 50% to 150% with respect to the breaker width B. In other words, with regard to the projected point D, where the first projected surface part 6a is furthest projected, the amount of shifting C relative to the virtual plane A is preferably adjusted in accordance with the dimensional relationship with the breaker width B. If the amount of shifting C is less than 50%, the recessed surface part 7 becomes too narrow, resulting in insufficient force being applied to chips toward the virtual plane A. If the amount of shifting C is above 150%, chips do not make contact with the projected point D of the projected surface part 6a, leading to the loss of the effect of improving chip disposal capacity. The dimension of the amount of shifting C is preferably from 0.1 mm to 1.5 mm. In the cutting insert 1 of the present embodiment, the breaker width B is approximately 1.0 mm, and the amount of shifting C is approximately 0.6 mm. In other words, the amount of shifting C is approximately 60% with respect to the breaker width B.

The projected surface part 6 and the recessed surface part 7 are formed in at least an upper part of the breaker wall surface 5. This is because the breaker wall surface 5 for enhancing chip disposal capacity exerts the maximum operation around the upper part thereof. Therefore, a lower part of the breaker wall surface 5 may have any shape unless it affects chip disposal capacity. In a plan view, an upper boundary of the projected surface part 6 has a substantially circular-arc shape. In a plan view, an upper boundary of the recessed surface part 7 has a substantially circular-arc shape. A curvature radius of the circular arc of the projected surface part 6 is smaller than a curvature radius of the recessed surface part 7.

Although the cutting insert 1 of the present invention has been described above, the cutting tool of the present invention is not limited thereto. The cutting tool is referred to as the cutting insert 1 in the description of the cutting tool of the present embodiment, but this is for the purposes of description only. The cutting tool can refer to not only a cutting insert but also the entirety of a cutting tool in which a cutting insert is mounted on a tool body. As stated above, it is not essential for the cutting tool of the present invention to employ a cutting insert. What is necessary is that the cutting edge member 3 comprised of an ultrahigh-pressure sintered body is secured to a portion serving as a cutting edge of the cutting tool. As for the method of securing the cutting edge member 3, known securing methods, such as brazing, are applicable.

The tool materials used for the cutting edge 8 of the cutting tool of the present invention and the peripheral area of the cutting edge are preferably selected from either diamond, an ultra-high pressure sintered body containing cubic boron nitride or a PVD or CVD coating applied to a surface of the ultra-high pressure sintered body.

The cutting tool of the present invention can be mounted on a machine tool so as to be used for the cutting of steel, etc. The cutting tool of the present invention is applied to a tool for lathes, a rotary cutting tool, etc., and almost no constraints are placed on the cutting tools to which the present invention is applicable. The present embodiment has described only the cutting insert 1 to be mounted on a tool for lathes, but the embodiment is not limited thereto.

The chip breaker of the cutting tool of the present invention may be formed by various known methods. For example, the chip breaker of the cutting tool of the present invention can be formed by grinding, electric discharge machining, electron beam machining, laser machining, or the like.

Figure 7:
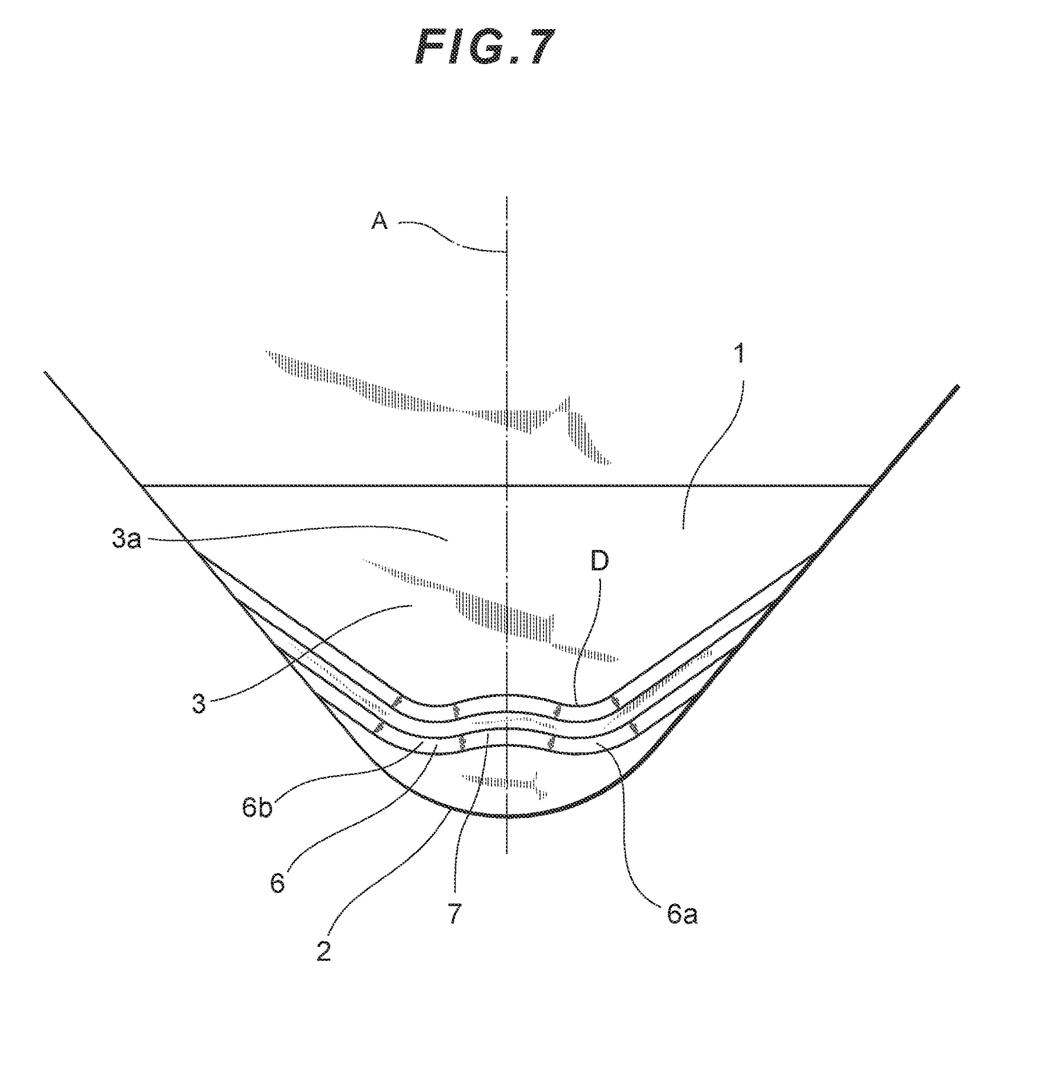
FIG. 7 is a partially enlarged, plan view of a cutting tool according to another embodiment.

The cutting tool of the present invention is not limited to the above-described embodiment, and various modifications and additions may be made to such embodiment without departing from the gist of the present invention. For example, using diamond for an ultrahigh-pressure sintered body, it is possible to employ a chip breaker shape suited for the cutting of aluminum alloy. Further, as shown in FIG. 7, a two-segment structured chip breaker having projected surface parts 6 may be provided. In the case of such two-segment structured chip breaker, the positions of the projected surface parts 6 may be aligned between the first segment and the second segment, but the projected surface parts 6 may alternatively be arranged such that the positions thereof are shifted between the first segment and the second segment. Furthermore, a cutting edge portion may be provided with a finishing edge portion, such as a wiper edge.

REFERENCE SIGNS LIST

1 Cutting insert
2 Corner part
3 Cutting edge member
3a End surface (upper surface)
4 Chip breaker
5 Breaker wall surface
6 Projected surface part
6a First projected surface part
6b Second projected surface part
7 Recessed surface part
8 Cutting edge
9 Rake surface
10 Flank
A Virtual plane
B Breaker width
C Amount of shifting
D Projected point

What is claimed is:
1. A cutting tool comprising a cutting edge member which forms at least one corner part of the cutting tool, wherein:
the cutting edge member is secured to the cutting tool;
a material for the cutting edge member is selected from either diamond, an ultrahigh-pressure sintered body containing cubic boron nitride or a PVD or CVD coating applied to a surface of the ultrahigh-pressure sintered body;
at least part of an intersecting edge between an end surface of the cutting edge member and a peripheral side surface thereof is provided with a cutting edge;
a chip breaker comprising a breaker wall surface is formed in the end surface of the cutting edge member;

the breaker wall surface has at least one projected surface part which is curved so as to bulge outward toward the cutting edge;

the breaker wall surface has a recessed surface part which is curved so as to be dented inward relative to the at least one projected surface part in a direction away from the cutting edge;

in a plan view of the cutting tool, the at least one projected surface part is arranged so as to be apart from a virtual plane A which is defined so as to divide the at least one corner part into halves;

in the plan view, a first contour shape of the at least one projected surface part located on an upper boundary of the breaker wall surface is a substantially circular arc shape;

in the plan view, a second contour shape of the recessed surface part located on the upper boundary of the breaker wall surface is a substantially circular arc shape;

in the plan view, a third contour shape of the at least one projected surface part located on a lower boundary of the breaker wall surface is a substantially circular arc shape;

in the plan view, a fourth contour shape of the recessed surface part located on the lower boundary of the breaker wall surface is a substantially circular arc shape;

a contour of the breaker wall surface connecting between the upper boundary and the lower boundary of the breaker wall surface is directly connected to a flank of the cutting edge member;

a rake surface extending from the cutting edge to the breaker wall surface along virtual plane A, wherein the rake surface is uninterrupted by any projection from a point of the cutting edge that intersects with the virtual plan A to the recessed surface part;

the at least one projected surface part comprises two projected surface parts, wherein the two projected surface parts are arranged so as to sandwich the recessed surface part therebetween; and the recessed surface part intersects with the virtual plane A.

2. The cutting tool according to claim 1, wherein the breaker wall surface is formed in a shape of plane symmetry to the virtual plane A.

3. The cutting tool according to claim 1, wherein the rake surface has a positive rake angle so as to be depressed inward of the cutting tool as the rake surface is further apart from the cutting edge.

4. The cutting tool according to claim 1, wherein:
in the plan view, a length defined as a direction parallel to the virtual plane A, which is measured from a center of the at least one corner part to the first contour shape of the at least one projected surface part located on the upper boundary of the breaker wall surface, the upper boundary being distant from the at least one corner part, as a breaker width length B, wherein the center of the at least one corner part occurs where the virtual plane A intersects the cutting edge,
in the plan view, a point, defined as located on the first contour shape, at a point corresponding to the breaker length B as a projected point D, and
in the plan view, a distance defined in a direction perpendicular to the virtual plane A, and which is measured from the virtual plane A to the projected point D, as an amount of shifting C,
the amount of shifting C is from 50% to 150% with respect to the breaker width length B.

5. The cutting tool according to claim 1, wherein, in the plan view, the first contour shape of the at least one projected surface part located on the upper boundary of the breaker wall surface is distant from the at least one corner part.

6. The cutting tool according to claim 1, wherein:
the cutting tool comprises a cutting insert.

7. The cutting tool according to claim 1, wherein the direct connection of the contour of the breaker wall surface is formed by extending the contour of the breaker wall from the substantially circular arc shape of the first contour shape and the substantially circular arc shape of the third contour to the flank at an angle with respect to the flank in the plan view.

* * * * *